April 14, 1970      D. L. VENEZKY      3,505,854
METHOD FOR DETERMINING ORGANIC LOADING ON CHARCOAL
Filed May 11, 1967
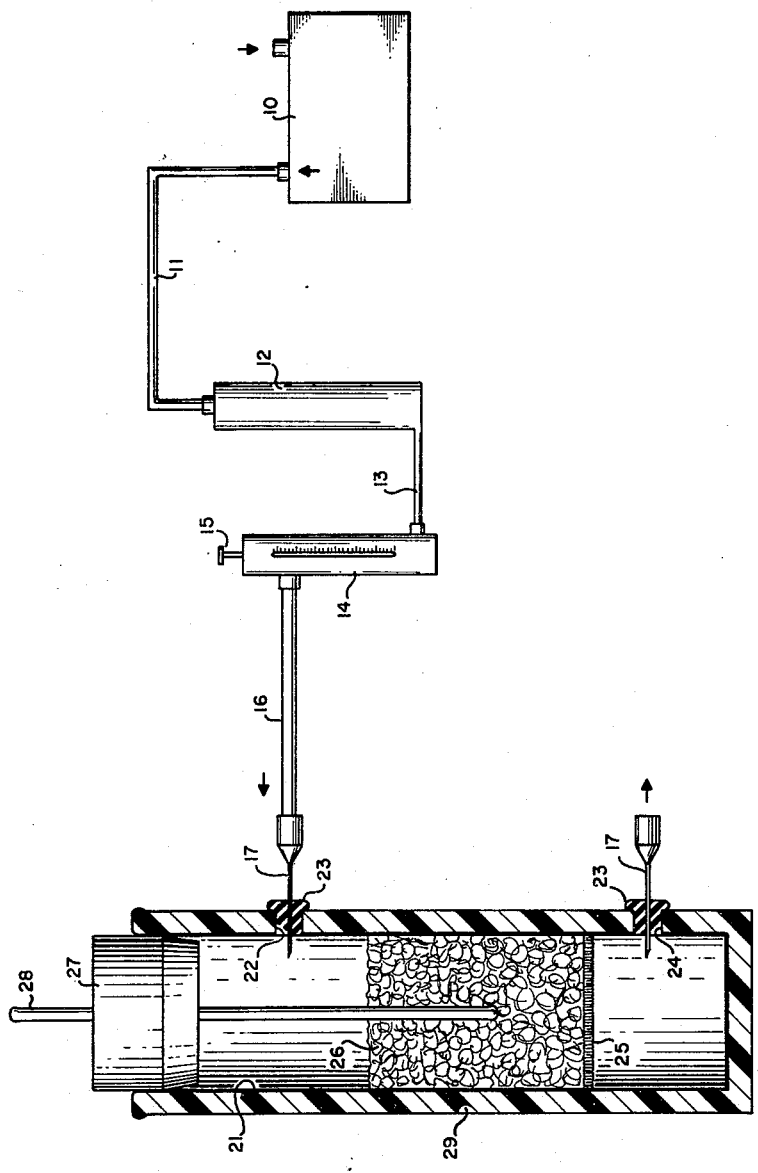
INVENTOR
DAVID L. VENEZKY
BY *Melvin L. Crane* AGENT
*P. Schiassi* ATTORNEY United States Patent Office 3,505,854
Patented Apr. 14, 1970

3,505,854
METHOD FOR DETERMINING ORGANIC LOADING ON CHARCOAL
David L. Venezky, Fairfax County, Va., assignor to the United States of America as represented by the Secretary of the Navy
Filed May 11, 1967, Ser. No. 638,708
Int. Cl. G01n 7/14
U.S. Cl. 73—19                                      3 Claims

ABSTRACT OF THE DISCLOSURE

This invention is directed to an apparatus and method for determining organic loading on charcoal which is used for air purification or for other purposes where organic materials are adsorbed. The method involves placing a sample of charcoal in an air-tight sample holder or tube in which a thermometer or any other temperature recording device is extended into the tube through the cap and placed in contact with the charcoal. Dry gas is forced through an opening above the charcoal and directed down through the charcoal at any desired flow rate for example five cubic feet per hour and exhausted below the charcoal into the atmosphere or recycled over a drying device in a closed system. The temperature indication given by the thermometer is observed and the time noted when the temperature reading reaches its lowest value. The amount of charcoal loading is related to the time required for the thermometer to reach its lowest temperature reading.

STATEMENT OF GOVERNMENT INTEREST

The invention described herein may be manufactured and used by or for the Government of the United States of America for governmental purposes without the payment of any royalties thereon or therefor.

This invention relates to methods of determining organic loading on charcoal which is used for air purification and more particularly to an apparatus and method for determining organic loading of charcoal at the scene where the charcoal is used.

The atmosphere in a closed environmental system, for example, in a nuclear submarine, spacecraft, or undersea laboratory, requires continuous decontamination. The common method used to remove hydrocarbons and other organic vapors is adsorption of the contaminants on activated charcoal. Typical charcoals adsorb 20 to 30 percent by weight of organic materials before losing their effectiveness. Presently, the cumulative amount of contaminants adsorbed on the charcoal-air-purifier in a closed environmental system, such as a submarine, becomes known only after the fact; main-filter-charcoal samples from submarines are usually analyzed after a cruise is completed. At an appropriate laboratory the amount of organic loading on a charcoal is then determined by steam desorption, vacuum desorption, or by nuclear magnetic resonance examination of liquid inert extractor which is used to elute organic adsorbates. The elaborate instrumentation and technical skills required prohibit shipboard use of these methods.

During protracted cruises of nuclear submarines, the practice was to replace the charcoal in the air filter every 20 or 30 days since an on-board method and apparatus was not heretofore available which could conveniently determine the cumulative hydrocarbon loading on charcoal; the intervals suggested for charcoal replacement was not directly correlated with the amount of residual adsorbent capacity. By setting conservative limits on the useful life of the charcoal, it is possible to avoid operation with charcoal which has become fully loaded; however, an accident could cause serious atmospheric contamination and fully load the charcoal before the scheduled replacement. Conversely, charcoal containing only a few percent loading might be discarded because of the scheduled periodic replacement. A solution to the problem of maintaining clean air in a submarine while obtaining maximum use of the charcoal requires an on-board monitoring system which is capable of measuring the organic loading on the charcoal in the air purifier.

Adsorbent-type charcoals have an approximate preference for adsorbates as follows: hydrocarbons and halogenated hydrocarbons is greater than water which is greater than noncondensable gases such as nitrogen, oxygen, and carbon dioxide. This property is paramount in the functioning of charcoal as an air purifier; organic compounds will, in general, displace the less strongly held water, $CO_2$ and other gases. The weight change of the charcoal as it adsorbs organic substances is complex, since low molecular weight materials such as water and air are replaced by a mixture of higher molecular weight compounds such as hydrocarbons, halogenated hydrocarbons and other organic compounds. Furthermore, the adsorbed quantity of the principal non-hydrocarbon, water, will vary according to the relative humidity.

In the nuclear submarine, relative humidity is generally maintained at 50 to 60%. Under such controlled conditions, the affinity of charcoal for water is relatively constant and the amount of water remaining on a given weight of charcoal bears an inverse relationship to the amount of hydrocarbons the charcoal has adsorbed, that is the organic loading of charcoal.

This invention is directed to a simple, inexpensive apparatus for on-site determination of the amount of organic loading on charcoal samples taken from the charcoal in the air filter on-board a submarine, spacecraft, under sea laboratory or any other closed environmental spaces. The method is based on the endothermic reaction which occurs when water is desorbed from charcoal and on the inverse proportionality between the amount of water adsorbed and the amount of organic materials adsorbed on charcoal.

It is therefore an object of the present invention to provide a simple inexpensive device for on-site determination of organic loading on charcoal which is used for air purification or for other purposes where organic materials are adsorbed.

Another object is to provide a device for determination of organic loading on charcoal which may be conducted by personnel having no special technical skills.

Still another object is to provide apparatus and method for determining organic loading on charcoal within a relatively short period of time at any desired place since the apparatus is on-site.

Other objects and advantages of the invention will hereinafter become more fully apparent from the following description of the annexed drawing, wherein;

The drawing illustrates a suitable apparatus for carrying out the method of the invention.

Now referring to the drawing, there is shown by illustration in the figure a suitable system for carrying out the method of this invention. The system includes an air pump 10 which may be of a diaphragm or any other suitable type connected by a suitable line 11 connecting the outlet thereof to the inlet of a drying tower 12 which contains therein a suitable desiccant. The outlet of the drying tower is connected by a suitable line 13 to the inlet of a flowmeter 14. The flowmeter includes a control or regulator value 15 for controlling the air flow therethrough. A line 16 is connected to the outlet side of the flowmeter and has connected to the opposite end thereof a small diameter sharp pointed element 17 such as a hypodermic needle through which air will flow. The hypodermic needle is forced into a sample holder tube 21 through an inlet 22 that is covered by a self sealing cover such as a serum cap 23. The sample holder tube 21 is also provided with an outlet 24 near the bottom thereof that is also covered by a serum cap 23. A hypodermic needle 17 or any other suitable means is used to exhaust the air to the atmosphere or to the low-pressure side of the pump in a closed system. The sample tube 21 has a porous disk 25, or any other means for supporting the charcoal, secured near the bottom thereof at a point above the outlet. The porous disk permits air to flow through a charcoal sample 26 held within the tube above porous disk 25 without carrying any charcoal with the air flow. The tube is also provided with a suitable stopper 27 which is provided with a thermometer 28 that extends through an aperture axially through the stopper. The thermometer extends downwardly into the tube such that the end thereof extends into the charcoal sample. The tube is surrounded by a covering of insulating material 29 that insulates the tube from the atmosphere.

In operation of the apparatus or system for carrying out the method, a known volume of charcoal in which organic loading is to be determined is placed in the insulated sample tube. The stopper having the thermometer therein is then placed within the top of the tube such that the end of the thermometer extends into the sample of charcoal. A hypodermic needle is inserted into the sample tube through the serum cap covering the exhaust end of the sample tube and the hypodermic needle that is connected to the air flow line is inserted into the sample tube through the serum cap covering the inlet of the tube. After the temperature reading of the thermometer has stabilized, the air pump is started forcing air through the desiccant in the drying tower, through the flowmeter, and through the hypodermic needle into the sample tube. The air flow is properly adjusted to flow at a convient flow rate of five cubic feet per hour at standard conditions. At the start of the air flow through the sample, the temperature reading and the time is recorded, then the temperature of the thermometer is wated until the temperature reading reaches a minimum value. At the time of reaching the minimum temperature reading, the time is noted and recorded. The time that the minimum temperature occurs varies inversely with respect to organic loading on the charcoal. Organic loading on charcoal samples which were measured to the fifteen millimeter mark on a graduated cylinder has been determined. For the flow rates of five cubic feet per minute and anhydrous calcium sulfate (Drierite) as the desiccant in a recycling system, minimum temperature occuring at eight minutes or greater indicate slightly loaded samples; and minimum-temperatures occurring at three and one half minutes or less indicate loadings near capacity, that is, above 20% loading. It has been determined, for example, from the above example set forth, that it the minimum-temperature is reached prior to three and one-half minutes of operation time, the organic loading of the charcoal being tested has reached it capacity; therefore, it should be changed.

Although no specific temperature control is necessary in carrying out the method, the temperature of the dry-gas should be approximately the same during the analysis and during the calibration for maximum accuracy. Correction for temperature variation can be determined from suitable charts. Since the moisture of the charcoal may vary with the relative humidity as well as organic loading, accuracy is improved if the environment is operated at a known constant relative humidity during air purification. In the absence of relative humidity control, impirical corrections for moisture content can be made from suitable charts.

It can be seen from the above, that the apparatus is simple to operate and that the results of an analysis can be ascertained within ten minutes time at the place in which the air-purifier charcoal is used.

The above method is based on the endothermic reaction which occurs when water is desorbed from charcoal and on the inverse proportionality between the amount of water adsorbed and the amount of organic materials adsorbed on charcoal.

The above method has been described as having a specific gas flow and a specific sample size. It is obvious that the charcoal sample size, dry-gas used such as air, nitrogen, helium, argon, etc., the tube design, flow rate of gas, and method of supplying dry-gas; that is, by tank or pressure pump may be varied. The temperature detecting device may be a thermometer, thermocouple, thermister, or any other suitable temperature detecting device and the time recording device may utilize a stop watch by the observer or any other more elaborate automatic recording device. A differential thermoanalyzer of differential scanning calorimeter may also be used to determine the time of the minimum temperature or the quantity of heat actually absorbed during the desorption of the water; both quantities are related to the organic loading on the charcoal. The method can also be applied to the exothermic absorption reaction of organic materials on charcoal.

What is claimed and desired to be secured by Letters Patent of the United States is:

1. A method of determining organic loading on charcoal used for purification of air in a known humidity environment; which comprises, removing a sample of a known volume of charcoal from a charcoal bed to be tested, placing the sample of charcoal within a sample holder, enclosing said sample holder as an air tight chamber, positioning a temperature determining means relative to said sample to continually determine the temperature thereof, permitting the temperature determining means to reach a constant temperature, passing a dry-gas through said charcoal sample at a constant flow rate to desorb water previously absorbed by the charcoal sample in said charcoal bed, recording the constant temperature reading and the time at the beginning of passing the dry-gas through the sample, constantly detecting the temperature reading, detecting the time at which the temperature reading reaches its minimum value during a constant gas flow through the sample due to evaporation of water in said sample and comparing the time required to reach the minimum temperature value with that for charcoals of known organic loading and under comparable conditions of charcoal volume and gas flow rate.

2. A method as claimed in claim 1; wherein, said dry-gas is selected from a group consisting of air, nitrogen helium and argon.

3. A method as claimed in claim 2; wherein, said dry-gas is air.

References Cited

UNITED STATES PATENTS

| | | | |
|---|---|---|---|
| 1,347,106 | 7/1920 | McAllister | 73—77 |
| 2,813,010 | 11/1957 | Hutchins | 55—274 |
| 2,951,156 | 8/1960 | Miller | 55—270 |

RICHARD C. QUEISSER, Primary Examiner

E. J. KOCH, Assistant Examiner